Patented Aug. 6, 1940

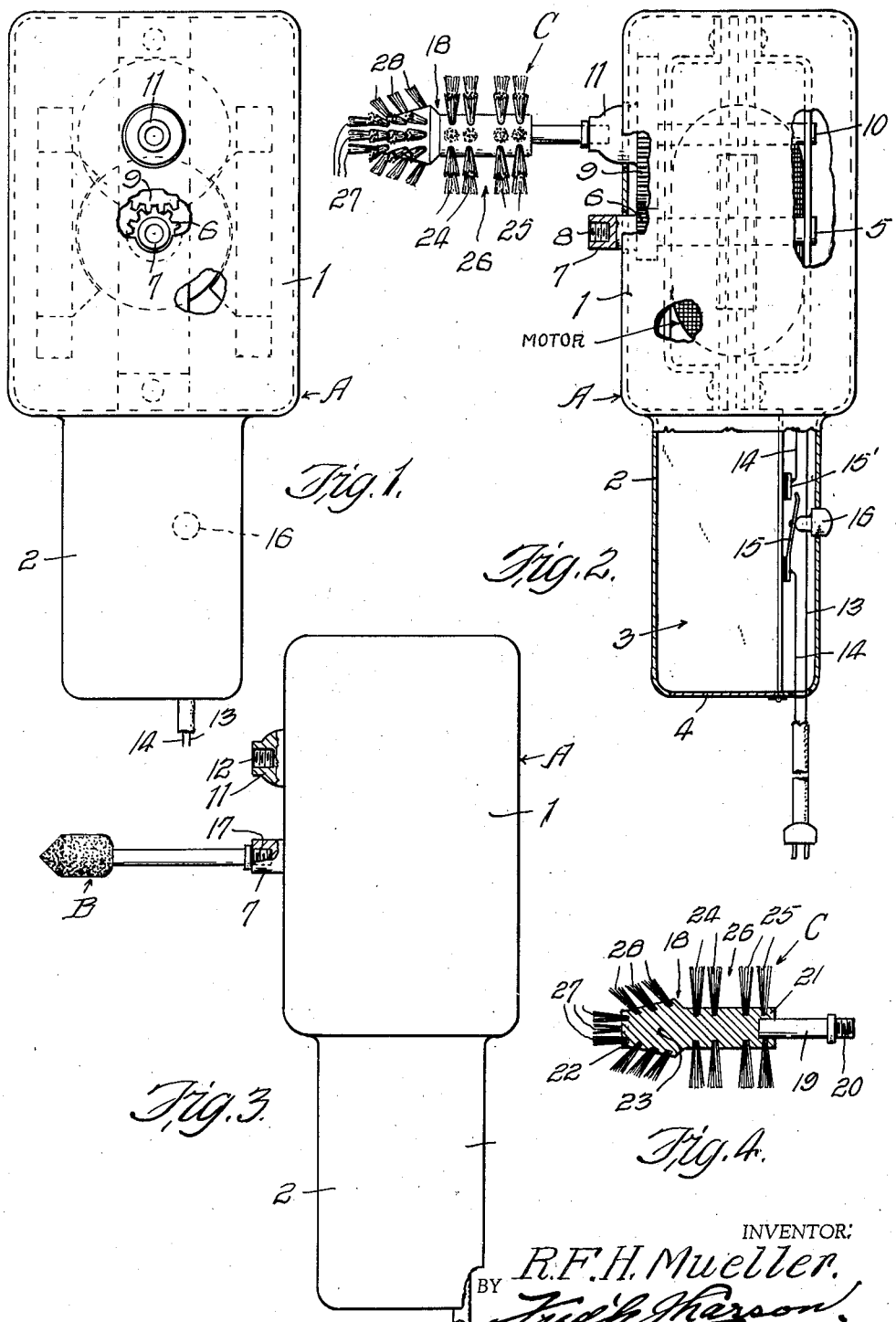

2,210,094

UNITED STATES PATENT OFFICE 2,210,094

DEVICE FOR CLEANING AND POLISHING DENTAL PLATES, ETC.

Reinhold F. H. Mueller, Jefferson City, Mo.

Application May 10, 1937, Serial No. 141,714

2 Claims. (Cl. 15—179)

My invention relates generally to cleaning and polishing devices, and, it has to do particularly with a device including means for cleaning and polishing dental plates, and finger nails and the like.

The primary object of the invention is to provide a portable device including a cleaning and polishing brush, or similar article, and means for removably connecting the cleaning and polishing devices with either of two electric motor driven shafts, one of said shafts being a slow speed shaft, and the other a high speed shaft.

A further object of the invention is to provide a device of this character which is provided with a storage compartment in the handle of the device.

A still further object of the invention is the provision of a device which is simple, small and durable in construction, reliable and highly efficient in operation, and, a device that can be made and sold at a minimum cost.

With the above and similar objects in view, the invention consists in certain novel features of construction, arrangement and combination of the several parts, hereinafter more fully described and finally pointed out in the claims hereto appended.

Referring to the accompanying drawing forming a part of this specification, wherein like characters of reference denote similar parts throughout the several views:

Fig. 1 is a front elevation of cleaning and polishing device embodying my invention.

Fig. 2 is a side elevation of the device, including a rotary brush for cleaning and polishing dental plates.

Fig. 3 is a view similar to Fig. 2, but including a finger nail polishing tool in the form of a buffer.

Fig. 4 is a longitudinal sectional view of the dental plate cleaning and polishing brush.

In carrying out the invention, I employ a suitable casing designated, generally, as A, which includes a section 1 in which is located a suitable electric motor, preferably of the induction type, and a lower section constituting a handle 2, also serving to provide a storage chamber 3 therein, and which is provided at its outer end with a suitable closure 4.

The main shaft 5 of said motor is provided with a pinion gear 6, within the casing section 1, and, the gear 6 is provided with a socket member 7 projecting from one side of the casing section 1. The socket member 7 is internally screw-threaded, as at 8, inwardly from the outer face thereof, and, with which socket a suitable finger nail cleaning and polishing tool is removably connected to be driven at high, or motor speed.

The gear 6 meshes with a large or reducing gear 9 secured to a jack-shaft 10, disposed above the shaft 5, in the upper end of section 1 of the casing A. The gear 9 is provided with a socket member 11 projecting from the side of the casing section 1, above and spaced from the socket member 7, and the socket member 11 is internally screw-threaded, as at 12, inwardly from the outer face thereof, and, with which socket 11, a suitable dental plate cleaning and polishing tool, hereinafter described, is removably connected.

Circuit wires 13 and 14 for the motor lead into the handle 2. Wire 13 leads to one of the coil windings, and the other of said wires 14 is connected with a movable spring contact member 15 and a stationary contact. Normally, the movable contact is out of engagement with the stationary contact, rendering the motor circuit open. A push button 16 is slidably carried by one of the walls of the handle and its inner end engages the movable contact. When the push button 16 is depressed by a thumb of the hand gripping the handle 2, the movable contact is moved at one end, into contact with the stationary contact to close the motor circuit.

The reference character B designates, generally, a suitable finger nail, or like cleaning or polishing tool, and, the tool is provided at one end with screw-threads 17 for removable connection with the internally screw-threaded socket 7 connected with the pinion gear 6 and driven at the same speed as the main or motor shaft 5.

In the process of cleaning and polishing upper and lower dental plates, various positions of the brush relative to the dental plates will be necessary to properly clean and polish the same, due to the iregular surfaces thereof, and, for this reason, the various sets of bristles are employed in the brush construction. In handling the brush, there are times in the process of cleaning and polishing the plates, that all groups or sets of bristles, that is, 27, 28, 24 and 25 are brought into use simultaneously, then again, only bristles 27 and 28. Again, only brisles 24 and 28 are positioned relative to certain plate surfaces, whereas, again only bristles 24 and 25 are effective on the plate surfaces. The various positions of the brush relative to the plate surfaces become necessary because of the irregular shapes of the plate surfaces to be cleaned and polished.

It is necessary to constantly change the position of the rotatable brush during a plate cleaning and polishing operation, and, therefore, all groups of bristles hereinbefore described are necessary for satisfactory plate cleaning and polishing results as the several bristle groups all come into play on different surfaces of dental plates before a final plate cleaning and polishing operation is completed. The various bristle groups of the brush permits the brush to be disposed for use in an upright position relative to a dental plate to be cleaned and polished at an angle thereto, and in a horizontal position.

The reference character C designates, generally, a dental plate cleaning and polishing brush, and, the body 18 of the brush is provided with a shank 19 having its free end provided with screw-threads 20 for removable connection with the internally screw-threaded socket member 11 and driven at the same low speed as the jack-shaft 10, which speed is considerably reduced from that of the main or motor shaft 5, so that rotation of the dental plate cleaning and polishing brush B will not throw water when in the act of cleaning and polishing dental plates.

The body 18 of the brush proper has a cylindrical rear section 21, a cylindrical outer end section 22 of smaller diameter than section 21 and relatively shorter in length, and an intermediate tapered or truncated conical section 23. The body section 21 is provided with a series of rows of suitable radially disposed bristles 24 and a series of rows of suitable radially disposed bristles 25, and the inner rows of each set of bristles are spaced further apart than the other rows of bristles to provide a space or gap 26. The body section 22 is provided on its end face with a series of bristles 27 projecting longitudinally of the body, and, the intermediate body section 23 is provided with a series of rows of suitable bristles 28 which project on an incline to the longitudinal axis of the body, and they project toward the front end of the brush, or in the direction of the bristles 27.

The many advantages of the herein described invention will readily suggest themselves to those skilled in the art to which it appertains.

From the foregoing description, it is evident that a simple device for this purpose has been disclosed, but it is to be understood that I do not desire to restrict, or limit myself to the very details of the construction shown and described, which is merely illustrative, it being obvious that changes, not involving the exercise of invention, may be made without conflicting or departing from the spirit of the invention within the scope of the appended claims.

What I claim is:

1. A rotatable power driven cleaning and polishing brush for individual use by persons to clean and polish their own upper and lower dental plates, said brush comprising a cylindrical body member terminating at its forward end in an enlarged frustro-conical head portion, a group of bristles projecting from the forward end face of the frustro-conical head portion, a group of bristles projecting from the peripheral face of the frustro-conical head portion at an acute angle to the axis thereof, two groups of bristles projecting radially from the cylindrical body member and spaced apart to provide a gap therebetween, and means projecting from the rear end face of the cylindrical body member for connection with an electric motor for rotating the brush.

2. A rotary cleaning and polishing brush adapted to be rotated so that a person can clean and polish his or her own upper and lower dental plates, said brush comprising a holder including a cylindrical rear portion and a frustro-conical forward head portion of greater diameter than the cylindrical rear portion, two spaced groups of bristles of equal lengths projecting radially from said cylindrical rear portion providing uniform circumferential cleaning and polishing surfaces at the ends of the bristles and to provide a gap between the cleaning and polishing surfaces of the two groups of bristles, a group of bristles of equal length projecting from the frustro-conical forward head portion at an acute angle to the axis of the holder, a group of bristles projecting from the forward end face of the frustro-conical head portion, and means projecting from the rear end face of the cylindrical rear portion of the holder for attachment to an electric motor.

REINHOLD F. H. MUELLER.